(12) United States Patent
Jacobs et al.

(10) Patent No.: US 7,994,231 B2
(45) Date of Patent: Aug. 9, 2011

(54) POLYAMIDE FOAMS, PROCESS TO MAKE THEM AND APPLICATIONS THEREOF

(75) Inventors: Paul Jacobs, Croyden (GB); Neil Witten, Croyden (GB)

(73) Assignee: Zotefoams PLC. (GB)

( * ) Notice: Subject to any disclaimer, the term of this patent is extended or adjusted under 35 U.S.C. 154(b) by 831 days.

(21) Appl. No.: 11/814,199

(22) PCT Filed: Jan. 18, 2006

(86) PCT No.: PCT/GB2006/000158
§ 371 (c)(1),
(2), (4) Date: Jul. 18, 2007

(87) PCT Pub. No.: WO2006/077395
PCT Pub. Date: Jul. 27, 2006

(65) Prior Publication Data
US 2008/0207782 A1    Aug. 28, 2008

(30) Foreign Application Priority Data
Jan. 18, 2005  (GB) .................................. 0500985.7

(51) Int. Cl.
*C08J 9/00* (2006.01)
*C08J 9/22* (2006.01)
*B29C 44/08* (2006.01)

(52) U.S. Cl. .......................... 521/134; 521/183; 521/189
(58) Field of Classification Search ........... 521/134,183, 521/189
See application file for complete search history.

(56) References Cited

U.S. PATENT DOCUMENTS

| 4,331,776 A | 5/1982 | Gazonnet et al. |
| 4,367,185 A * | 1/1983 | Nojiri et al. .................... 264/416 |
| 6,039,085 A | 3/2000 | Hsich et al. |
| 6,596,388 B1 | 7/2003 | Obeng et al. |
| 6,613,811 B1 * | 9/2003 | Pallaver et al. ................. 521/81 |

FOREIGN PATENT DOCUMENTS

| JP | 54063161 | * | 5/1979 |
| JP | 54063166 A | * | 5/1979 |
| JP | 610268737 | * | 11/1986 |
| JP | 63280747 A | * | 11/1988 |
| JP | 04015235 A | * | 1/1992 |
| JP | 4-356541 | * | 12/1992 |
| JP | 2002-363626 | * | 12/2002 |

* cited by examiner

*Primary Examiner* — Irina S Zemel
(74) *Attorney, Agent, or Firm* — Joseph T. Leone, Esq.; DeWitt Ross & Stevens S.C.

(57) ABSTRACT

Closed cell polyamide foams are prepared by subjecting a polyamide resin to inert gases at an elevated pressure and at a temperature above the softening point of the resin and reducing the pressure while the temperature is maintained above the softening point of the resin, resulting in expansion of the resin.

12 Claims, No Drawings

POLYAMIDE FOAMS, PROCESS TO MAKE THEM AND APPLICATIONS THEREOF

The present invention relates to polyamide foams, process to make them and applications thereof.

High quality foams are produced by impregnating polyamide resins or alloys with inert gas at high pressure and then reducing the pressure to expand the material. Preferentially the materials are cross linked to allow the impregnation and expansion to take place well above the normal melting point. The foams obtained can be fabricated into any desired shape, such as pipes, sheets, tapes, blocks and rods, using techniques such as cutting, welding, thermoforming and adhesive bonding. Alternatively the polyamide resin or alloy may be expanded directly into the desired shape, for example, by expanding the impregnated polyamide resin or alloy in a mould. They are useful in applications where low density, high temperature properties are required. They have the additional benefits of high purity, good chemical resistance, and good thermal resistance. They also exhibit good acoustic and thermal insulation characteristics.

Closed cell foams are materials used in applications where light weight, flotation, thermal insulation, electrical insulation and cushioning effects are required. Closed cell foams made out of polystyrene, polyethylene of different densities and polyurethanes are widely known. However, foams made from the cited materials are limited in thermal and chemical resistance. Foams made from polyamides can fulfil these requirements.

There are a number of processes that are known for the production of foamed polyamides. These can be broadly divided into two groups; the first being processes in which the polyamide precursor is simultaneously polymerised and foamed in the presence of an activator and catalyst and the second being those in which a physical or chemical blowing agent is used to foam the polymer in the molten state.

The U.S. Pat. No. 4,464,491, U.S. Pat. No. 4,442,234, U.S. Pat. No. 4,028,287, U.S. Pat. No. 4,026,834 and U.S. Pat. No. 4,022,719 describe a number of processes in which polyamide precursors are simultaneously polymerised and foamed. A process of this kind is also disclosed in DE 3226818 (Phoenix AG).

Processes in which blowing agents are added to a polyamide melt are typically injection moulding, where a reduction in part weight or the elimination of sink marks are desired, or extrusion, where density reduction is the primary goal. The U.S. Pat. No. 6,039,085 describes the addition a chemical blowing agent to a polyamide immediately prior to the coextrusion the polyamide as part of a multi-layer tubing assembly. It will be recognised by those skilled in the art that it is essential to get the blowing agent evenly distributed within the polyamide melt if a uniform foam is to be extruded. The U.S. Pat. No. 4,331,776 teaches the use of low temperature fusible binders to produce a blowing agent masterbatch suitable for use in polyamide.

JP 04356540 (Furukawa Electric Co. Ltd) discloses a process for forming a cellular thermoplastic resin comprising adding an inert gas to the resin under elevated pressure, expanding the resin by heating it to a temperature at which its semicrystallization time is 5 minutes or below, and cooling the resin.

JP 11080408 (Yamaha Corp.) relates to a process in which a resin is foamed by heating the resin in the presence of an inert gas, raising the pressure until the gas is in a liquid or supercritical state, removing the resin from the pressurised container, heating the resin to above the glass transition temperature in order to cause foaming and then quenching the resin to stop cellular growth.

EP 0402883 (Du Pont) discloses the foaming of a polyamide resin by extruding it with a blowing agent.

The journal article "Processing of Polyamide 11 with Supercritical Carbon Dioxide" (Martinache et al., *Ind. Eng. Chem. Res.* 2001, 40, 5570-5577) describes a method of foaming a polyamide resin using supercritical carbon dioxide as a blowing agent in a batch process in which the temperature is quenched before the pressure is released.

WO 2005/105907 in the name of the present applicant was published after the priority date of the present application and relates to a method for foaming a fluoropolymer resin.

This invention relates to a method and products made by this method which allows the production of high quality polyamide foams. Polyamide resins or alloys are subjected to inert gases at elevated temperatures and pressures, whereupon they absorb certain quantities of these gases. Reducing the pressure at a temperature above the melting point of the resin or alloy allows these resins to be expanded to produce closed cell polyamide foams with a very homogeneous cell size distribution and a high percentage of closed cells. The expansion stage may take place in the high pressure vessel used to absorb the gases into the resin or alloy or in a secondary lower pressure vessel. If a secondary vessel is to be used the resin or alloy must be cooled under pressure in order to limit the expansion occurring in the first vessel.

In a first aspect of the present invention there is provided a process for making closed cell polyamide foam comprising the steps of:

(a) subjecting a polyamide resin to at least one inert gas at a pressure preferably higher than atmospheric in order to drive gas into the resin, (a1) raising the temperature of the resin to or above its softening point, wherein steps (a) and (a1) can take place in any order or simultaneously, and (b) reducing the pressure whilst maintaining the temperature at or above the softening point of the resin, in order to expand the resin to result in closed cell polyamide foam.

Operating above the melting point reduces the time for the gas to diffuse into the sheet and increases the amount of gas in the sheet at a given pressure.

The polyamide resin may be provided in combination with one or more other components in a blend or an alloy.

In a preferred embodiment the polyamide is cross linked prior to expansion as this allows the process to be operated above the melting point of a semi-crystalline resin without severe flow of the material. This reduces the time for the gas to diffuse into the sheet and increases the amount of gas in the sheet at a given pressure. Crosslinking can be obtained by use of crosslinking agents such as triallyl isocyanurate (TAIC) or triallyl cyanurate (TAC) and irradiation by either electron beam processing or gamma processing. Typical doses for direct radiation crosslinking are in the range of 5 to 200 kGy, but a preferential range is 25 to 100 kGy. Typically electron beam energies are in the range of 0.5 to 10 MeV with the higher energies being preferable for the irradiation of thicker sheets.

Although it is preferred that the pressure in step (a) is higher than atmospheric pressure, in theory all that is required is a pressure differential in order to drive the gas into the resin.

The length of time of step (a) depends on factors such as the identity of the resin, its thickness and the temperature and pressure of the gas. Preferably, the resin is treated until it becomes saturated with the gas (which can be determined empirically using an iterative weighing process).

In step a) the temperature is preferably above the glass transition of the polyamide resin during impregnation, and advantageously at or above the melting point if the polyamide is semi-crystalline. One skilled in the art will recognise that both the glass transition temperature and the melting point will be influenced by the pressure at which the process is being operated.

Advantageously, prior to step (a), the polyamide resin is formed into the desired shape, typically a thick sheet although other shapes may be contemplated, using any of the techniques known to those skilled in the art, for example, extrusion, injection moulding or compression moulding.

In step (b), the temperature is preferably maintained above the softening point until such time as the desired expansion is achieved. This is controlled by controlling the drop in pressure in step (b). The temperature is advantageously at or above the melting point if the polyamide is semi-crystalline. The pressure is reduced allowing these resins to be expanded to produce closed cell polyamide foam. Step (b) may take place in the high pressure vessel used to absorb the gases into the resins.

In one embodiment, step (a) takes place in a high pressure vessel and the expansion step (b) takes place in a second, lower pressure vessel. More preferably, before step (b):
(a2) the pressure is lowered to a pressure higher than atmospheric pressure but lower than the pressure of step (a) and the resin is cooled to below its softening point to result in a partially expanded polyamide resin,
(a3) the partially expanded polyamide resin is heated to a temperature above its softening point under a pressure of gas, preferably air or inert gas.

The temperature of the partially expanded resin resulting from step (a2) may be maintained at ambient or advantageously may be reduced to below ambient in order to slow the expected loss of gas from the resin. This has the advantage that the time available between steps (a2) and (a3) can be extended such that step (a3) and (b) can then be carried out at a later time and/or at a remote location.

After transfer to a secondary lower pressure vessel, the partially expanded resin is reheated to a temperature at which the resin is sufficiently soft to allow expansion to occur. The pressure is preferably in a range between 5 and 200 bar, advantageously 5 to 40 bar and more preferably 10 to 20 bar.

Those skilled in the art will recognise the use, for this purpose, of storage and shipping containers used in the handling and long distance movement of perishable goods such as meats and other foodstuffs. Such containers typically maintain the content of the container in a sub-ambient temperature environment. Temperatures down to −40° C. (−40° F.) have been utilised.

The partially expanded polyamide resin from step (a2) may be heated in a mould whereupon the heat causes the polyamide resin to soften and expand into the mould.

The result is a closed cell polyamide foam artefact of a defined shape. This process is distinct from the thermoforming process in which previously expanded foam is heated and then moulded to the desired shape.

Alternatively, the partially expanded resin from step (a2) may be retained in the form of a high density closed cell polyamide foam without the need for further expansion.

Thus in a second aspect of the present invention there is provided a process for making closed cell polyamide foam comprising the steps of:
(a) subjecting a polyamide resin to at least one inert gas in order to drive gas into the resin,
(a1) raising the temperature of the resin to or above its softening point, wherein steps (a) and (a1) can take place in any order or simultaneously, and
(a2) lowering the pressure to a pressure higher than atmospheric pressure but lower than the pressure of step (a) and cooling the resin to below its softening point to result in a partially expanded polyamide resin.

In a particularly preferred embodiment, the closed cell polyamide foam is substantially homogeneous. The process is preferably carried out only on the polyamide resin and not on any other material simultaneously with said resin.

It is particularly preferred that the invention relate to a batch process rather than a continuous process. In other words, discrete batches of resin are individually treated in pressure vessels rather than a potentially infinite length of resin being treated in a continuous process for example in an extruder.

The present invention also relates to the polyamide foams made by the disclosed process, with preference for polyamide-6 polymers and its blends and alloys.

The present invention also relates to:
the transformation of said polyamide foams by welding, gluing, cutting, routing, punching, stamping, laminating and thermoforming into any desirable shape such as pipes, rods, sheaths, containers, balls, sheets, rolls and tapes
the use of said polyamide foams in flotation devices,
the use of said polyamide foams in any desired shape in thermal or thermal acoustic insulation,
the incorporation of said polyamide foams together with sheets, films, foams, textiles, reinforcements and other materials known to those skilled in the art, into complex sandwich structures by lamination, adhesive bonding, sewing and other fastening techniques,
the use of said polyamide foams in gaskets or seals,
the use of said polyamide foams in packaging material or in containers, As regards the polyamide, foamable polyamides are of such a type that they can be transformed by extrusion, injection moulding, compression moulding or other forming techniques known to those skilled in the art. The polyamides can be semicrystalline or amorphous; preferably they are semicrystalline, blends or alloys. Preferably the polyamides can be radiation crosslinked, usually with the addition of a crosslinking additive or co-agent, such as triallyl isocyanurate (TAIC) or triallyl cyanurate (TAC). Preferably the crosslinking additive or co-agent is added in the form of a masterbatch or compound in order to ensure a high level of dispersion. The carrier resin used in such a masterbatch or compound should be compatible with the polyamide to be foamed and is preferably the same polyamide.

Preferably the polyamide is a polyamide-6 polymer (and its blends and alloys), particularly where the polyamide is in combination with a polyolefin such as polyethylene or polypropylene. These polyamides and polyamide alloys, such as Orgalloy® (Arkema) are well known and widely used. They may be melted in typical processing equipment for thermoplastic resins for extrusion or moulding or combinations such as extrusion-blown film and moulding. The polyamide resins may be pigmented or include other additives, modifiers or reinforcements, including functional additives such as flame and smoke suppressants. Also contemplated are any other polymers which are melt processable and cross linkable by any other means, for example, free radical cross linking.

As regards the inert gases, only inert low boiling gases such as argon, carbon dioxide and nitrogen and combinations of such gases are used as blowing agents. The preferred embodiment uses nitrogen as the blowing agent. The inert gas is allowed to diffuse into the polyamide at a specific temperature and pressure to achieve a predefined density on expansion.

The foams are usually produced in the form of sheets. The sheets can be cut using a bandsaw, water-jet cutter, router or any other technique known to those skilled in the art. They can be hot welded by standard techniques to form laminates with any desired thickness. The sheets can be cut into thin strips. The polyamide foam can be thermoformed into many shapes by use of a heatable mould. For instance rings, cups, half pipes, bowls, buckets, balls or oval shaped objects can be obtained. The surface will have a closed skin due to a healing effect of the outermost cell walls. The sheets can be thermoformed and fixed to form a thermal or sound insulating layer for piping systems, vessels and containers. The sheets can be cut and/or thermoformed to form seals and gaskets. Shaped objects of polyamide foam can be assembled with other materials by bonding with adhesives or using heat lamination techniques.

EXAMPLES

Example 1

A slab of polyamide 6 was prepared by extrusion blending 75% of an extrusion grade of polyamide 6 (Frianyl B83H, Frisetta Polymers GmbH) with 25% of a crosslinkable polyamide 6 compound (Frianyl B63 VN, Frisetta Polymers GmbH). The slab was irradiated by 4.5 MeV electron beam to a dose of 36 kGy. The slab was then placed in a pressure vessel into which nitrogen was introduced to a pressure of 670 bar. The temperature was raised to 250° C. and the pressure was maintained until the slab was saturated with nitrogen. The pressure was then reduced and the pressure vessel was cooled. Once cooled the residual pressure was released to atmospheric. The partly expanded slab was placed in a second vessel and reheated to 240° C. under a pressure of 17 bar of nitrogen. The pressure was then released to give a fine celled foam with a density of 30 kg/m$^3$.

Example 2

A crosslinkable masterbatch was produced by compounding triallyl isocyanurate, in the form of a dry liquid concentrate (TAIC DLC-A, Natrochem Inc.), in to the polyamide/polyolefin alloy Orgalloy LE60 LM (Arkema Ltd). A slab of Orgalloy was then prepared by extrusion blending this masterbatch with more Orgalloy LE60 LM in order to achieve a TAIC concentration of 0.8%. The slab was irradiated by 4.5 MeV electron beam to a dose of 36 kGy. The slab was saturated with nitrogen and then expanded as described in Example 1. The resulting foam had a fine cell structure at a density of 28 kg/m$^3$.

Example 3

A slab of polyamide 11 was prepared by extrusion blending 80% of a polyamide 11 (Rilsan BESNO P40 TL, Arkema Ltd) with 20% of a crosslinkable polyamide 6 compound (Frianyl B63 VN, Frisetta Polymers GmbH). The slab was irradiated by 4.5 MeV electron beam to a dose of 36 kGy. The slab was saturated with nitrogen and then expanded as described in Example 1. The resulting foam had a fine cell structure at a density of 35 kg/m$^3$.

Example 4

A slab of amorphous polyamide was prepared by extrusion blending 80% of a semi-aromatic amorphous polyamide (Cristamid MS1100, Arkema Ltd) with 20% of a crosslinkable polyamide 6 compound (Frianyl B63 VN, Frisetta Polymers GmbH). The slab was irradiated by 4.5 MeV electron beam to a dose of 36 kGy. The slab was saturated with nitrogen and then expanded as described in Example 1. The resulting foam had a fine cell structure at a density of 38 kg/m$^3$.

Example 5

A slab of polyamide 6 was prepared by extrusion blending 71% of an extrusion grade of polyamide 6 (Akulon F236-C, DSM Engineering Plastics) with 25% of a crosslinkable polyamide 6 compound prepared from the same resin and 4% of a commercially available polyamide 6 carbon black masterbatch. The slab was irradiated by 4.5 MeV electron beam to a dose of 50 kGy. The slab was saturated with nitrogen at 250° C. and 480 bar and then expanded as described in example 1. The resulting foam had a fine cell structure at a density of 70 kg/m$^3$.

Example 6

A slab of polyamide 6 was prepared by extrusion blending 75% of an extrusion blow moulding grade of polyamide 6 (Durethan TP142-007, Lanxess AG) with 25% of a crosslinkable polyamide 6 compound (Frianyl B63 VN, Frisetta Polymers GmbH). The slab was irradiated by 4.5 MeV electron beam to a dose of 36 kGy. The slab was saturated with nitrogen at 250° C. and 480 bar and then expanded as described in example 1. The resulting foam had a fine cell structure at a density of 52 kg/m$^3$.

Example 7

A slab of polyamide 6 was prepared by extrusion blending 75% of an extrusion grade of polyamide 6 (Akulon F236-C, DSM Engineering Plastics) with 25% of a crosslinkable polyamide 6 compound (Frianyl B63 VN, Frisetta Polymers GmbH). The slab was irradiated by electron beam with energy of 10 MeV to a dose of 50 kGy. The slab was saturated with nitrogen at 250° C. and 670 bar and then expanded as described in example 1. The resulting foam had a fine cell structure at a density of 51 kg/m$^3$.

Example 8

A slab of polyamide 6 was prepared by extrusion blending 75% of an extrusion grade of polyamide 6 (Akulon F236-C, DSM Engineering Plastics) with 25% of a crosslinkable polyamide 6 compound (Frianyl B63 VN, Frisetta Polymers GmbH). The slab was irradiated by gamma radiation to a dose of 50 kGy. The slab was saturated with nitrogen at 250° C. and 480 bar and then expanded as described in example 1. The resulting foam had a fine cell structure at a density of 96 kg/m$^3$.

Some of the properties of the foams from the examples above are given in the table below.

TABLE 1

| Example No. | Resin | Foam Density ISO 845 kg/m³ | Tear Strength ASTM D624 N/m | Tensile Strength ISO 1798 kPa | Elongation ISO 1798 % |
|---|---|---|---|---|---|
| 1 | Frianyl B83 H | 30 | 3271 | 1057 | 76 |
| 2 | Orgalloy LE60 LM | 28 | 2735 | 637 | 58 |
| 3 | Rilsan BESNO TL | 35 | 3787 | 926 | 103 |
| 4 | Cristamid MS1100 | 38 | 4799 | 1164 | 51 |
| 5 | Akulon F-236C | 70 | — | 2300 | 68 |
| 6 | Durethan TP142-007 | 52 | — | — | — |
| 7 | Akulon F236-C | 51 | — | — | — |
| 8 | Akulon F236-C | 96 | — | — | — |

The invention claimed is:

1. A process for making closed cell polyamide foam comprising the steps of:
   (a) subjecting a polyamide resin to at least one inert gas at a pressure higher than atmospheric in order to drive gas into the resin,
   (a1) raising the temperature of the resin to or above its softening point, wherein steps (a) and (a1) can take place in any order or simultaneously, and
   (a2) lowering the pressure to a pressure higher than atmospheric pressure but lower than the pressure of step (a) and cooling the resin to below its softening point to result in a partially expanded polyamide resin, and
   (a3) heating the partially expanded polyamide resin to a temperature above its softening point under a pressure of gas, and then,
   (b) reducing the pressure whilst maintaining the temperature at or above the softening point of the resin, in order to expand the resin to result in closed cell polyamide foam.

2. A process as claimed in claim 1 in which step (a) takes place with the resin in a first vessel and wherein, before step (a3) is carried out, the partially expanded resin is transferred to a second vessel.

3. A process as claimed in claim 1, wherein the temperature of the partially expanded resin resulting from step (a2) is reduced to slow loss of the gas from the resin.

4. A process as claimed in claim 1, in which the polyamide resin is, prior to step a), extruded into the form of a sheet.

5. A process as claimed in claim 1, in which the polyamide resin is a polyamide-6.

6. A process as claimed in claim 1, in which the polyamide resin is blended or alloyed with a polyolefin.

7. A process as claimed in claim 6 wherein the polyolefin is polyethylene.

8. A process as claimed in claim 1, in which in step a) the pressure is from 20 to 1000 bar.

9. A process as claimed in claim 8 in which the pressure is from 20 to 800 bar.

10. A process as claimed in claim 1 in which in step a2) the pressure is from 5 to 200 bar.

11. A process as claimed in claim 10 in which the pressure is from 5 to 40 bar.

12. A process as claimed in claim 1, in which the polyamide resin is cross-linked prior to expansion in step (a2).

* * * * *